(No Model.)
E. S. PLIMPTON.
Wagon Brake Lever.
No. 230,334. Patented July 20, 1880.
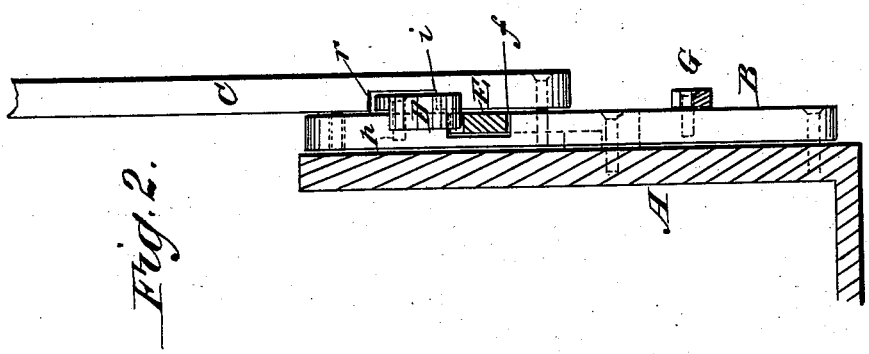
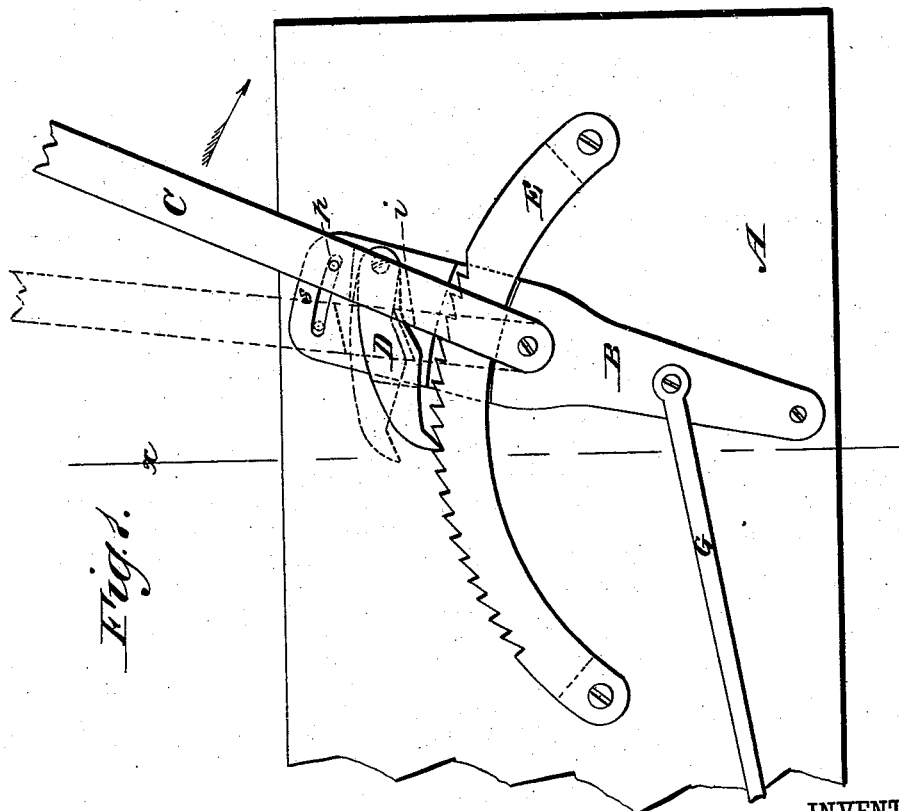
WITNESSES:
INVENTOR:
E. S. Plimpton
BY
ATTORNEYS.

UNITED STATES PATENT OFFICE.

EDWARD S. PLIMPTON, OF DENISON, IOWA.

WAGON-BRAKE LEVER.

SPECIFICATION forming part of Letters Patent No. 230,334, dated July 20, 1880.

Application filed May 31, 1880. (No model.)

*To all whom it may concern:*

Be it known that I, EDWARD S. PLIMPTON, of Denison, in the county of Crawford and State of Iowa, have invented a new and useful Improvement in Wagon-Brake Mechanism, of which the following is a specification.

My invention consists in a novel construction and arrangement of a double-jointed lever, and the combination thereof with a pawl and ratchet and a rod connecting with the brake-shoe, whereby provision is made for locking the brake by the engagement of the pawl with the ratchet, and for disengaging the pawl at pleasure in order to release the brake.

In the accompanying drawings, Figure 1 is a side view of my invention. Fig. 2 is a transverse vertical section taken in the line $x$ $x$ of Fig. 1.

Similar letters of reference indicate corresponding parts.

A represents one of the side-boards of the body of a wagon or vehicle of any suitable description. B is a lever having its lower end pivoted to the side-board A, so as to oscillate in a vertical plane.

C is a lever having its lower end pivoted to the side of the lever B about midway of the length thereof. Near the upper end of the lever B is a transverse slot, $s$, and in this slot works a pin or stud, $p$, projecting from the lever C, by which means the motion of the lever C independently of the lever B is limited.

To the lever B is attached the heel of a pawl, D, the point of which engages with a ratchet-bar, E, attached to the side-board A, the teeth of the ratchet being on the upper edge of the bar, which is curved in the form of an arc of a circle drawn from the fulcrum of the lever B. The ratchet-bar E is arranged so that the lever B works between it and the side-board, and the bar thus serves as a keeper to hold the lever in place. The lever B is provided with a recess, $f$, in which the ratchet-bar E lies flush with the outer surface of said lever.

On the inner side of the lever C, next to the pawl, is a recess, $r$, in which the pawl works freely. The lower side of this recess is inclined in a direction parallel with the length of the ratchet-bar, the highest part of the inclined plane $i$ being toward the front of the vehicle.

The upper end of the lever C is provided with a handle for operating it.

G is a rod or bar connecting with the brake, for applying and releasing it. The front end of this rod is pivoted to the lever B about midway between the fulcrum of said lever and the point where the lever C is pivoted to the lever B.

The operation is as follows: When the lever C is moved in the direction of the arrow the pin $p$ moves forward to the front end of the slot $s$, and the two levers B C become a compound lever. The pawl D drops of its own weight, and engages with the ratchet E, pulling on the brake-rod G, and holding the brake firmly at whatever pressure may be applied.

When it is desired to release the brake the lever C is moved backward, the pin $p$ sliding backward in the slot $s$ to the rear end thereof. This motion causes the highest part of the inclined plane $i$ to engage with the lower side of the pawl D and lift the point of said pawl from the ratchet, as shown in dotted lines. The compound lever may then be moved farther back so as to release the brake.

If desired, the inclined plane $i$ may be provided with a friction-roller for engagement with the pawl.

In order to secure the ratchet-bar E and lever C more firmly to the wagon-body, and to prevent rattling, a curved bar, corresponding with the curve of the ratchet-bar, may be placed outside of the lever and secured by a suitable number of bolts.

Having thus fully described my invention, I claim as new and desire to secure by Letters Patent—

The compound lever B C, provided with the recess $r$ and inclined plane $i$, in combination with the pawl D, for disengaging it from the ratchet, substantially as herein described.

EDWARD SEAGRAVE PLIMPTON.

Witnesses:
A. J. BOND,
G. R. KNIGHT.